(No Model.)
B. P. WHITNEY.
TWO WHEELED VEHICLE.
No. 272,177. Patented Feb. 13, 1883.
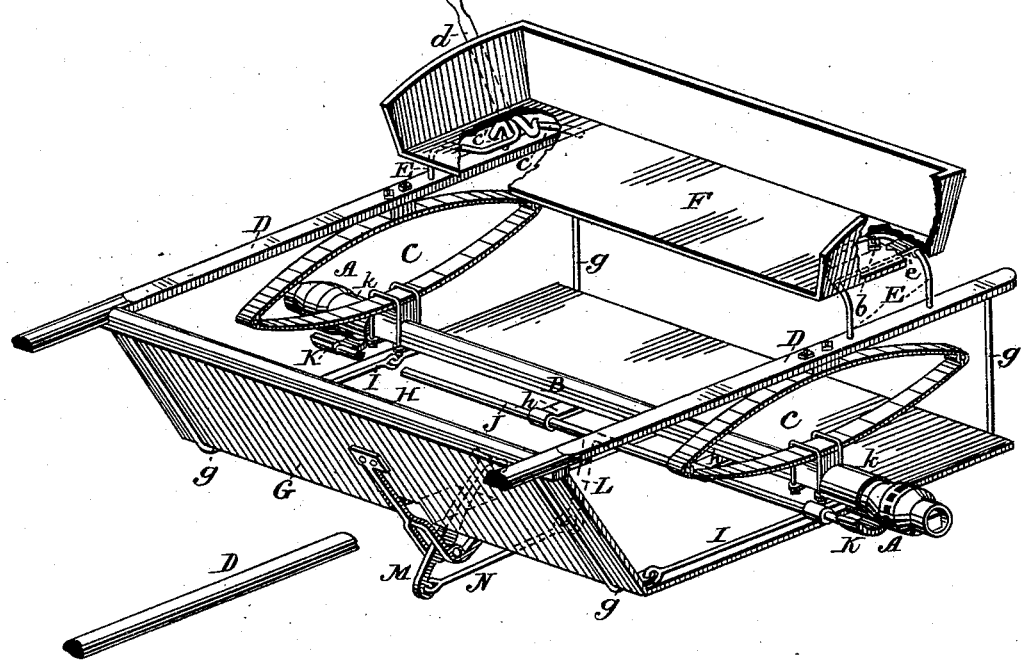
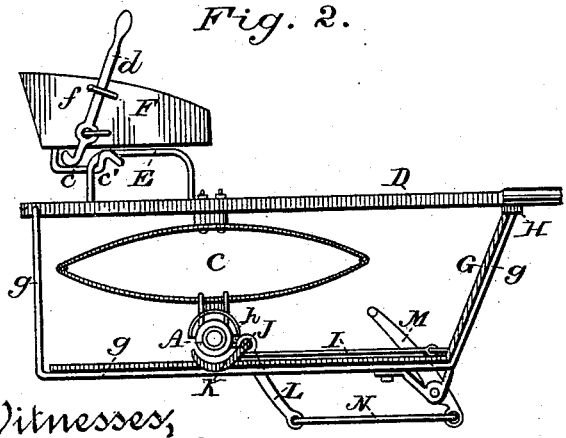
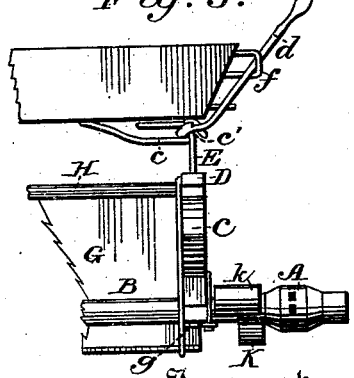
Witnesses,
Geo. H. Strong.
J. H. Rouse.
Inventor
B. P. Whitney
By Dewey & Co.
Attorneys

UNITED STATES PATENT OFFICE.

BENJAMIN P. WHITNEY, OF POTTER VALLEY, CALIFORNIA.

TWO-WHEELED VEHICLE.

SPECIFICATION forming part of Letters Patent No. 272,177, dated February 13, 1883.

Application filed October 10, 1882. (No model.)

*To all whom it may concern:*

Be it known that I, BENJAMIN P. WHITNEY, of Potter Valley, county of Mendocino, State of California, have invented an Improved Two-Wheeled Vehicle; and I hereby declare the following to be a full, clear, and exact description thereof.

My invention relates to certain improvements in two-wheeled vehicles; and these improvements consist in a means for supporting and hinging the seat at one end to the shaft and latching it at the other, in certain draft irons or rods attached to the axle and to the foot-board, and in braking the hub of the wheels and in a means therefor, as will hereinafter fully appear.

The object of my invention is to furnish an easy entrance to and exit from the vehicle, and an easy-riding seat to transfer a portion of the draft from the side springs to the axle when a sudden jerk occurs. The accomplishment of these results will be better seen from the following particular description.

Referring to the accompanying drawings, Figure 1 is a perspective view of my device. Fig. 2 is a side elevation. Fig. 3 is a portion of a rear elevation.

Let A represent the hubs of wheels mounted on axle B.

Upon top of the axle are rigidly clipped the elliptical side springs, C, to the tops of which are firmly clipped the shafts D.

Upon the shafts are bolted the small springs E. These consist of spring-rods curved and extending inwardly and inclining upwardly, as shown. One of these springs E has a cross plate or bar, *e*, through which a pivot-bolt, *b*, extends into the bottom of the seat F at one end. The seat is thus pivoted to the spring E, and is adapted to swing backward from the opposite shaft. Under the seat at its other end is a spring-latch, *c*. The end of this is adapted, when the seat is turned to close, to pass under the edge of the spring E, and to spring up to fit its shoulder *c'* within the spring, thus latching itself and securing the seat. To disengage it I have the bent lever *d* pivoted to the end of the seat. Its lower end extends under the seat and above the spring-latch, and its upper end is guided in an outwardly-extending guard, *f*. When the lever is drawn in, its lower end depresses the spring-latch and disengages it from the spring E, so that the seat may be turned back to afford ready access. When turned in again it latches itself.

G is the foot-board. This is secured in front to a bottom board, H, between the shafts. It passes under the axle, and is secured by rods or straps *g* to the rear ends of the shafts. This is a foot-board in common use; but I have explained it to show my draft-rods. These are marked I. They are linked to the axle by their rear ends, and are attached to the foot-board by their forward ends. The advantage of these rods I will now explain. It will be seen that the shafts are bolted on top of the springs C, and that the draft is on said springs. This is well enough and produces no strain if the draft remain equal, as on a level road. But suppose the wheels strike a rut, the springs widen out in their reaction, and at the same moment the horse gives a sudden jerk. This happens at the wrong time for the springs to offer any resistance, and consequently much strain is brought upon them, and they are in no condition to relieve the rider from the effect of the jerk; but by having the rods I the sudden draft or a portion of it is transferred to the axle and the springs relieved.

In front of the axle, in suitable bearings, *h*, attached thereto, is mounted a shaft, J, the ends of which extend to the hubs A of the wheels. To these ends are properly secured friction-plates K, or, more properly, brake-plates. These extend under the hubs, following their curve, say, for about one hundred and eighty degrees.

From the center of the shaft J extends downward through a slot in the foot-board an arm, L.

Under the front of the foot-board is pivoted a foot-lever, M, the upper end of which extends through the foot-board, and is in convenient position for the foot of the rider. Its lower end is connected with the end of arm L by a rod, N. When the foot-lever M is pressed forward, the shaft J is rocked to bind its brake-plates K under and against the hubs A of the wheels, thus braking said wheels.

In order to conceal the hub made bright by friction, I have a cap, *k*, curved over its top.

I am aware that hub-brakes are not new of themselves, and that they have been applied to four-wheeled vehicles; but as far as I know they have never been applied to two-wheeled vehicles, and herein they possess an advantage and produce an effect which they do not have and produce in four-wheeled vehicles.

In two-wheeled vehicles most all the weight is borne by the horse, and it is not good to add any unnecessary weight. That is why brakes applied to the tire of the wheel have been found to be disadvantageous, as points of resistance are thrown so far to one side of the axle that whether the brakes be applied to the front or back of the tire it is equally hard on the horse. In one case he has to keep the shafts up, in the other down, both of which efforts are aggravated when descending or ascending a grade; but these objections do not apply to the hub-brake. The points of resistance are here at the axle, and no extra weight is put on the horse to keep the shaft straight.

The effect of tire-brakes is so well known that they are seldom found on carts, and are never used in a hilly country. The hub-brake may, however, be used with advantage.

Having thus described my invention, what I claim as new, and desire to secure by Letters Patent, is—

1. In a two-wheeled vehicle, the shafts D and the springs E upon them, in combination with the seat F, supported on springs E, pivoted at one end to one of said springs and latched at the other end to the other, substantially as herein described.

2. In a two-wheeled vehicle, the shafts D and the springs E upon them, one of said springs having a cross-plate, $e$, in combination with the seat F, pivoted at one end to the cross-plate, and having at the other end the spring-latch $c$, with its shoulder $c'$, and the bent lever $d$, all arranged and operating substantially as herein described.

3. In a two-wheeled vehicle, the axle B and foot-board G, secured to the shafts, in combination with the draft-rods I, connecting the axle with the foot-board, substantially as herein described.

4. In a two-wheeled vehicle, the axle B, side springs, C, and shafts D on said springs, in combination with the foot-board G and the draft-rods I, linked to the axle and secured to the foot-board, all arranged and operating substantially as herein described.

In witness whereof I hereunto set my hand.

BENJAMIN P. WHITNEY.

Witnesses:
G. W. EMERSON,
S. H. NOURSE.